(12) United States Patent
Liu et al.

(10) Patent No.: US 11,443,553 B1
(45) Date of Patent: Sep. 13, 2022

(54) SCALABLE TRAINING DATA PREPARATION PIPELINE AND EFFICIENT DISTRIBUTED TRAINER FOR DEEP NEURAL NETWORKS IN FACIAL RECOGNITION

(71) Applicant: Clearview AI, Inc., New York, NY (US)

(72) Inventors: Zhi Liu, New York, NY (US); Cam-Hoan Ton-That, New York, NY (US)

(73) Assignee: Clearview AI, Inc., New York, NY (US)

( * ) Notice: Subject to any disclaimer, the term of this patent is extended or adjusted under 35 U.S.C. 154(b) by 0 days.

(21) Appl. No.: 17/676,914

(22) Filed: Feb. 22, 2022

(51) Int. Cl.
*G06V 40/16* (2022.01)
*G06V 10/774* (2022.01)
*G06V 10/82* (2022.01)
*G06V 10/74* (2022.01)
*G06V 10/762* (2022.01)

(52) U.S. Cl.
CPC .......... *G06V 40/172* (2022.01); *G06V 10/761* (2022.01); *G06V 10/762* (2022.01); *G06V 10/774* (2022.01); *G06V 10/82* (2022.01)

(58) Field of Classification Search
CPC .. G06V 40/172; G06V 10/761; G06V 10/762; G06V 10/774; G06V 10/82
See application file for complete search history.

(56) References Cited

U.S. PATENT DOCUMENTS

| | | | |
|---|---|---|---|
| 7,734,067 B2 * | 6/2010 | Kim | G06V 40/172 340/5.1 |
| 9,147,128 B1 * | 9/2015 | Chafni | G06V 40/50 |
| 11,151,386 B1 * | 10/2021 | Aggarwal | H04N 21/84 |
| 2016/0299920 A1 * | 10/2016 | Feng | G06F 16/70 |
| 2017/0228453 A1 * | 8/2017 | Gupta | G06F 16/583 |
| 2019/0026641 A1 * | 1/2019 | Lu | G16B 30/00 |
| 2019/0311182 A1 * | 10/2019 | Mishra | G06V 40/161 |
| 2022/0189193 A1 * | 6/2022 | Wang | G06V 40/178 |

\* cited by examiner

*Primary Examiner* — Wesley J Tucker
(74) *Attorney, Agent, or Firm* — Fox Rothschild LLP

(57) ABSTRACT

This disclosure provides a highly scalable training data preparation pipeline for data cleaning and augmentation with the aim of extracting the most meaningful information while keeping the noise level low, as well as a highly efficient distributed trainer for the deep neural networks suitable for facial recognition. The goal is to train deeper and larger neural networks with larger and higher quality facial image datasets iteratively and frequently without incurring prohibitive costs and drastic delays.

24 Claims, 11 Drawing Sheets

SCALABLE TRAINING DATA PREPARATION PIPELINE AND EFFICIENT DISTRIBUTED TRAINER FOR DEEP NEURAL NETWORKS IN FACIAL RECOGNITION

FIELD

This invention relates to scalable training data preparation pipeline and efficient distributed trainer for deep neural networks in facial recognition.

BACKGROUND

Artificial intelligence is used in a variety of contexts. For example, facial recognition (or face recognition) often makes use of artificial intelligence techniques. Computerized facial recognition technology has many useful applications, including, for instance, automatic identification of potential security threats in airports and other locations, in mobile and other computing platforms in connection with biometric authentication techniques, etc. Facial recognition is even becoming popular in more commercial applications such as, for example, payment authentication.

Facial recognition algorithms have made tremendous strides towards higher accuracy, less bias while still being highly performant and usable with commercial hardware since 2017. The emergence of deep convolutional neural networks, coupled with normalization techniques and updated understanding of the classification layer, as well as margin-based Softmax loss functions together contributed to the revolution. As differentiating factors in model architectures and loss functions become easily adaptable, the remaining potential for improvement lies in larger training datasets of the order of tens to hundreds of millions of facial images from millions of unique identities, with less noise and more meaningful information. This poses difficulty to various parts of the model training apparatus.

Accordingly, there is a strong need for improved methods and systems to train facial recognition models.

SUMMARY

This disclosure addresses the need mentioned above in a number of aspects. In one aspect, this disclosure provides a method for generating a facial image dataset for training a facial recognition model, comprising: (a) receiving a set of facial images comprising a plurality of subsets of facial images, each of the subsets of facial images is associated with a pre-assigned identity label; (b) performing intra-identity facial image deduping for each subset of facial images by: determining pairwise intra-identity facial image similarity scores between the facial images in the each subset of facial images; identifying two or more facial images within the each subset of facial images as duplicate facial images associated with the same identity label if the two or more facial images have an intra-identity similarity score greater than or equal to an intra-identity similarity threshold value; and retaining only one of the duplicate facial images after removing the rest of the duplicate facial images; (c) performing intra-identity clustering by applying a first clustering similarity threshold to group the deduped facial images in the each subset of facial images into a plurality of clusters; and (d) performing intra-identity second-order clustering by determining pairwise cluster similarity scores between centroid vectors of clusters and combining clusters having pairwise cluster similarity score greater than or equal to a second clustering similarity threshold to obtain an intra-identity cleaned facial image dataset, wherein the combined clusters and remaining uncombined clusters are respectively associated with a plurality of actual identities.

In some embodiments, the identity label is selected from a username, a search engine keyword, and an image uploader.

In some embodiments, the step of identifying two or more facial images within each subset of facial images as duplicate facial images associated with the same identity label is performed by an existing neural network facial recognition model. In some embodiments, the step of determining pairwise facial image similarity scores comprises determining cosine similarity scores between feature vectors generated by an existing neural network facial recognition model.

In some embodiments, the step of determining pairwise facial image similarity scores further comprises generating an intra-identity similarity matrix. In some embodiments, the similarity threshold value is between about 0.9 and about 0.95. In some embodiments, the first clustering similarity threshold is between about 0.45 and about 0.5. In some embodiments, the second clustering similarity threshold is between about 0.45 and about 0.5.

In some embodiments, the combined clusters and the remaining uncombined clusters each correspond to an actual identity, and wherein the actual identity corresponds to the pre-assigned identity label themselves, their friends thereof, or their photography subjects.

In some embodiments, the combined clusters and the remaining uncombined clusters are each assigned new identity labels and become new subsets of facial images.

In some embodiments, the method comprises removing the actual identity cluster with face counts lower than three faces.

In some embodiments, the method further comprises preprocessing the facial images. In some embodiments, the step of preprocessing comprises detecting one or more faces in a facial image. In some embodiments, the step of preprocessing comprises detecting a face in a facial image, cropping, resizing, gradation conversion, median filtering, histogram equalization, or size normalized image processing.

In some embodiments, the method further comprises performing inter-identities merging by: determining pairwise inter-identity similarity scores between centroid feature vectors of different subsets of facial images that are associated with different identity labels; and merging two or more subsets of facial images having an inter-identity similarity score greater than or equal to a first inter-identity similarity threshold value to obtain an inter-identity cleaned facial image dataset.

In some embodiments, the method further comprises performing inter-identities deduping by: (i) determining pairwise inter-identity facial image similarity scores between centroid feature vectors of different subsets of facial images that are associated with different identity labels; (ii) identifying two or more subsets of facial images as duplicate subsets of facial images associated with the same identity label if the two or more subsets of facial images have an inter-identity similarity score greater than or equal to a second inter-identity similarity threshold value; and (iii) retaining only one of the duplicate subsets of facial images after removing the rest of the duplicate subsets of facial images.

In some embodiments, the first inter-identity similarity threshold value is about 0.5 or above. In some embodiments, the second inter-identity similarity threshold value is between about 0.4 and about 0.45.

In some embodiments, the step of determining the pairwise facial image similarity scores between facial images comprises determining cosine similarity scores between feature vectors generated by an existing neural network facial recognition model.

In some embodiments, the step of determining pairwise facial image similarity scores further comprises generating an inter-identity similarity matrix.

In some embodiments, the step of identifying two or more facial images within the different subsets of facial images as duplicate facial images is performed by an existing neural network facial recognition model.

In some embodiments, the method comprises iteratively training and updating the existing neural network facial recognition model using the inter-identity cleaned facial image dataset.

In some embodiments, the method further comprises distributing feature centroid vectors in chunks to a plurality of graphics processing units (GPUs), wherein each chunk is distributed to one GPU. In some embodiments, an inner product between the centroid vectors from the same set and the chunks in the GPUs become similarity scores, and wherein the similarity scores below a threshold are removed and the remaining similarity scores are streamed into a file to form a sparse matrix representation for efficiency of storage and downstream processing. In some embodiments, the threshold is between about 0.2 and about 0.4.

In some embodiments, the method further comprises augmenting facial images in the cleaned facial image dataset by adding one or more variations selected from accessory addition, lighting variations, age simulation, pose alteration, and face blending.

In another aspect, this disclosure provides a method for training a neural network facial recognition model at scale. The method comprises (a) receiving a batch of facial image data and dividing the batch into two or more parts; (b) performing label synchronization and classification layer sampling using full batch labels and keeping track of the normalized weight as a result of the sampling process; (c) forwarding a first part of the batch through a neural network backbone distributed in a plurality of GPUs; (d) synchronizing resulting feature vectors and splitting previously synchronized labels to obtain corresponding labels for the first part of the batch and running forward-backward with sampled weight to compute loss and gradients for sampled weight and feature vectors; (e) running backward from the feature vectors with the gradients to back-propagate and derive gradients for backbone parameters in each layer; (f) performing steps (c) to (e) for the part of the two or remaining parts of the batch to allow gradients to accumulate over the first pass for both the sampled weight and the backbone parameters; (g) synchronizing all the backbone parameters across all of the plurality of GPUs; (h) running an optimizer for the sample weight and the backbone parameters; and (i) assigning back the sampled weight and optimizer states to the classification layer.

In some embodiments, the batch of facial image data is generated according to the method described herein. In some embodiments, the neural network facial recognition model is used in the method described herein to generate the feature vectors of the facial image dataset.

In some embodiments, the method comprises discarding activations of one or more initial layers in the backbone during the forward pass and recomputing them during the backward pass. In some embodiments, step (h) comprises running the optimizer based on layer-adaptive learning rate scaling.

In another aspect, this disclosure provides a system for generating a facial image dataset for training a facial recognition model. The system comprises a non-transitory, computer-readable memory; one or more processors; and a computer-readable medium containing programming instructions that, when executed by the one or more processors, configure the system to: (i) receive a set of facial images comprising a plurality of subsets of facial images, each of the subsets of facial images is associated with a pre-assigned identity label; (ii) perform intra-identity facial image deduping for each subset of facial images by: determining pairwise intra-identity facial image similarity scores between the facial images in the each subset of facial images; identifying two or more facial images within the each subset of facial images as duplicate facial images associated with the same identity label if the two or more facial images have an intra-identity similarity score greater than or equal to an intra-identity similarity threshold value; and retaining only one of the duplicate facial images after removing the rest of the duplicate facial images; (iii) perform intra-identity clustering by applying a first clustering similarity threshold to group the deduped facial images in the each subset of facial images into a plurality of clusters; and (iv) perform intra-identity second-order clustering by determining pairwise cluster similarity scores between centroid vectors of clusters and combining clusters having pairwise cluster similarity score greater than or equal to a second clustering similarity threshold to obtain an intra-identity cleaned facial image dataset, wherein the combined clusters and remaining uncombined clusters are respectively associated with a plurality of actual identities.

In some embodiments, the identity label is selected from a username, a search engine keyword, and an image uploader.

In some embodiments, the step of identifying two or more facial images within each subset of facial images as duplicate facial images associated with the same identity label is performed by an existing neural network facial recognition model. In some embodiments, the step of determining pairwise facial image similarity scores comprises determining cosine similarity scores between feature vectors generated by an existing neural network facial recognition model.

In some embodiments, the step of determining pairwise facial image similarity scores further comprises generating an intra-identity similarity matrix. In some embodiments, the similarity threshold value is between about 0.9 and about 0.95. In some embodiments, the first clustering similarity threshold is between about 0.45 and about 0.5. In some embodiments, the second clustering similarity threshold is between about 0.45 and about 0.5.

In some embodiments, the combined clusters and the remaining uncombined clusters each correspond to an actual identity, and wherein the actual identity corresponds to the pre-assigned identity label themselves, their friends thereof, or their photography subjects. In some embodiments, the combined clusters and the remaining uncombined clusters are each assigned new identity labels and become new subsets of facial images.

In some embodiments, the system is further configured to remove the actual identity cluster with face counts lower than three faces.

In some embodiments, the system is further configured to preprocess the facial images, and wherein preprocessing comprises detecting a face in a facial image, cropping, resizing, gradation conversion, median filtering, histogram equalization, or size normalized image processing.

In some embodiments, the system is further configured to perform inter-identities merging by: determining pairwise inter-identity similarity scores between centroid feature vectors of different subsets of facial images that are associated with different identity labels; and merging two or more subsets of facial images having an inter-identity similarity score greater than or equal to a first inter-identity similarity threshold value to obtain an inter-identity cleaned facial image dataset.

In some embodiments, the system is further configured to perform inter-identities deduping by: (i) determining pairwise inter-identity facial image similarity scores between centroid feature vectors of different subsets of facial images that are associated with different identity labels; (ii) identifying two or more subsets of facial images as duplicate subsets of facial images associated with the same identity label if the two or more subsets of facial images have an inter-identity similarity score greater than or equal to a second inter-identity similarity threshold value; and (iii) retaining only one of the duplicate subsets of facial images after removing the rest of the duplicate subsets of facial images.

In some embodiments, the first inter-identity similarity threshold value is about 0.5 or above. In some embodiments, the second inter-identity similarity threshold value is between about 0.4 and about 0.45.

In some embodiments, the step of determining the pairwise facial image similarity scores between facial images comprises determining cosine similarity scores between feature vectors generated by an existing neural network facial recognition model.

In some embodiments, the step of determining pairwise facial image similarity scores further comprises generating an inter-identity similarity matrix.

In some embodiments, the step of identifying two or more facial images within the different subsets of facial images as duplicate facial images is performed by an existing neural network facial recognition model.

In some embodiments, the system is further configured to iteratively train and update the existing neural network facial recognition model using the inter-identity cleaned facial image dataset.

In some embodiments, the system is further configured to distribute feature centroid vectors in chunks to a plurality of graphics processing units (GPUs), wherein each chunk is distributed to one GPU. In some embodiments, an inner product between the centroid vectors from the same set and the chunks in the GPUs become similarity scores, and wherein the similarity scores below a threshold are removed and the remaining similarity scores are streamed into a file to form a sparse matrix representation for efficiency of storage and downstream processing. In some embodiments, the threshold is between about 0.2 and about 0.4.

In some embodiments, the system is further configured to augment facial images in the cleaned facial image dataset by adding one or more variations selected from accessory addition, lighting variations, age simulation, pose alteration, and face blending.

In yet another aspect, this disclosure provides a system for training a neural network facial recognition model at scale. The system comprises a non-transitory, computer-readable memory; one or more processors; and a computer-readable medium containing programming instructions that, when executed by the one or more processors, configure the system to: (a) receive a batch of facial image data and dividing the batch into two or more parts; (b) perform label synchronization and classification layer sampling using full batch labels and keeping track of the normalized weight as a result of the sampling process; (c) forward a first part of the batch through a neural network backbone distributed in a plurality of GPUs; (d) synchronize resulting feature vectors and splitting previously synchronized labels to obtain corresponding labels for the first part of the batch and running forward-backward with sampled weight to compute loss and gradients for sampled weight and feature vectors; (e) run backward from the feature vectors with the gradients to back-propagate and derive gradients for backbone parameters in each layer; (f) perform steps (c) to (e) for the part of the two or remaining parts of the batch to allow gradients to accumulate over the first pass for both the sampled weight and the backbone parameters; (g) synchronize all the backbone parameters across all of the plurality of GPUs; (h) run an optimizer for the sample weight and the backbone parameters; and (i) assign back the sampled weight and optimizer states to the classification layer.

In some embodiments, the batch of facial image data is generated according to the system described above. the neural network facial recognition model is used in the system described above to generate the feature vectors of the facial image dataset.

In some embodiments, the system is configured to discard activations of one or more initial layers in the backbone during the forward pass and recomputing them during the backward pass. In some embodiments, step (h) comprises running the optimizer based on layer-adaptive learning rate scaling.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

This disclosure provides a highly scalable training data preparation pipeline for data cleaning and augmentation with the aim of extracting the most meaningful information while keeping the noise level low, as well as a highly efficient distributed trainer for the deep neural networks suitable for facial recognition. The goal is to train deeper and larger neural networks with larger and higher quality facial image datasets iteratively and frequently without incurring prohibitive costs and significant delays.

Figure 1:
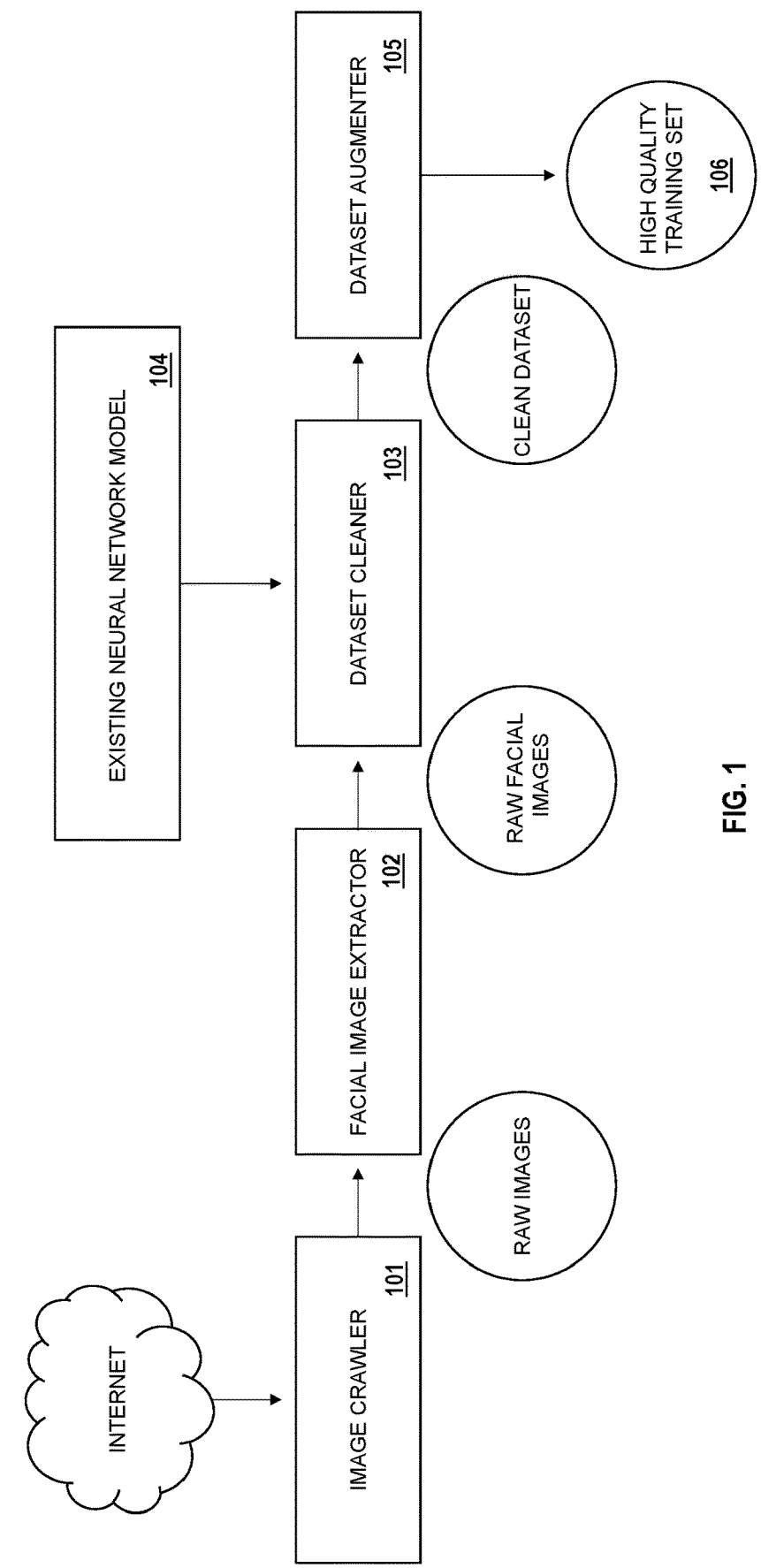
FIG. 1 shows an example scalable training data preparation pipeline.

Methods and Systems for Generating a Facial Image Dataset for Training a Facial Recognition Model Notably, unlike regular image scraping where metadata other than storing it within legal boundaries generally is not a concern, image scraping for training data needs to center around the concept of identity. As shown in FIG. 1, the facial images can be downloaded and stored using an image crawler 101, such as an automated web crawler. Facial images and other related information can be acquired from the Internet using, for example, a web crawler through public means and scanning social networking websites or professional networking websites. Importantly, personally identifiable information is not required to generate a facial image dataset for training a facial recognition model. In addition, facial images in the training dataset are no longer needed after a trained facial recognition model is generated.

In some embodiments, the system may transform image data into characteristic vectors or multidimensional matrices. Characteristic vectors or multidimensional matrixes include the important features of a facial structure. In some embodiments, the system may include a database that only store the transformed facial image data (or vectorized facial image data), such that original facial images are not accessible without an operation to inverse the transformed images. In some embodiments, the system may apply encryption to original image data or transformed image data. The database may be remotely located and accessed through the Internet via a server. In one embodiment, an image query to the database server can be made in conjunction with a text-based search algorithm executed by the server to retrieve a multi-media object from or through the database. In some embodiments, the database can be a database of known individuals (e.g., law enforcement, surveillance, and recently driver licenses). For example, the database can be the image database that is a known-criminal database, a law-enforcement database, or a database of the image hosting website.

The system may extract faces from raw facial images using a facial image extractor 102. In addition, The system may pre-assign an identity label to a subset of facial images. The identity could be a username from a public social media website, or a name keyword to a search engine query. In some embodiments, the identity label is selected from a username, a search engine keyword, and an image uploader.

Also, it is necessary to collect as many unique facial images in as many conditions and age progression as possible to gather a wide range of meaningful information that can be learned by neural networks to carry out identity classification tasks. In addition, it is necessary to ensure that the facial images corresponding to an identity label indeed belong to the identity (intra-identity cleanliness), and there are no other images of the same identity mislabeled as a different identity (inter-identity cleanliness). Thus, the system continues by performing intra-identity and/or inter-identity cleaning using dataset cleaner 103. At this step, it is advantageous to employ an existing, pre-trained neural network facial recognition model 104. Additionally, the system may perform dataset augmentation using a dataset augmenter 105 to increase facial image variations for an identity to obtain a high quality facial image training set 106. A highly effective approach to increase meaningful variations within an identity is to augment the facial images in certain ways that maintain high fidelity to the natural occurrence of that identity, such as accessories (e.g., glasses, hats, masks), lighting variations, and aging.

Facial Image Extraction

As an initial step, faces are detected in downloaded images. For example, faces may be detected and extracted using a facial recognition algorithm to automatically recognize the detected faces. Each image could contain zero to many faces with varying degrees of quality. There could be duplicated or extremely similar images. They could contain the subject of the search engine keyword, the person who uploaded the image or their friends, etc. Notably, the majority of faces do not necessarily correspond to the subject or uploader. It is important to preserve all sub-identities for completeness.

Cleaning

Figure 2:
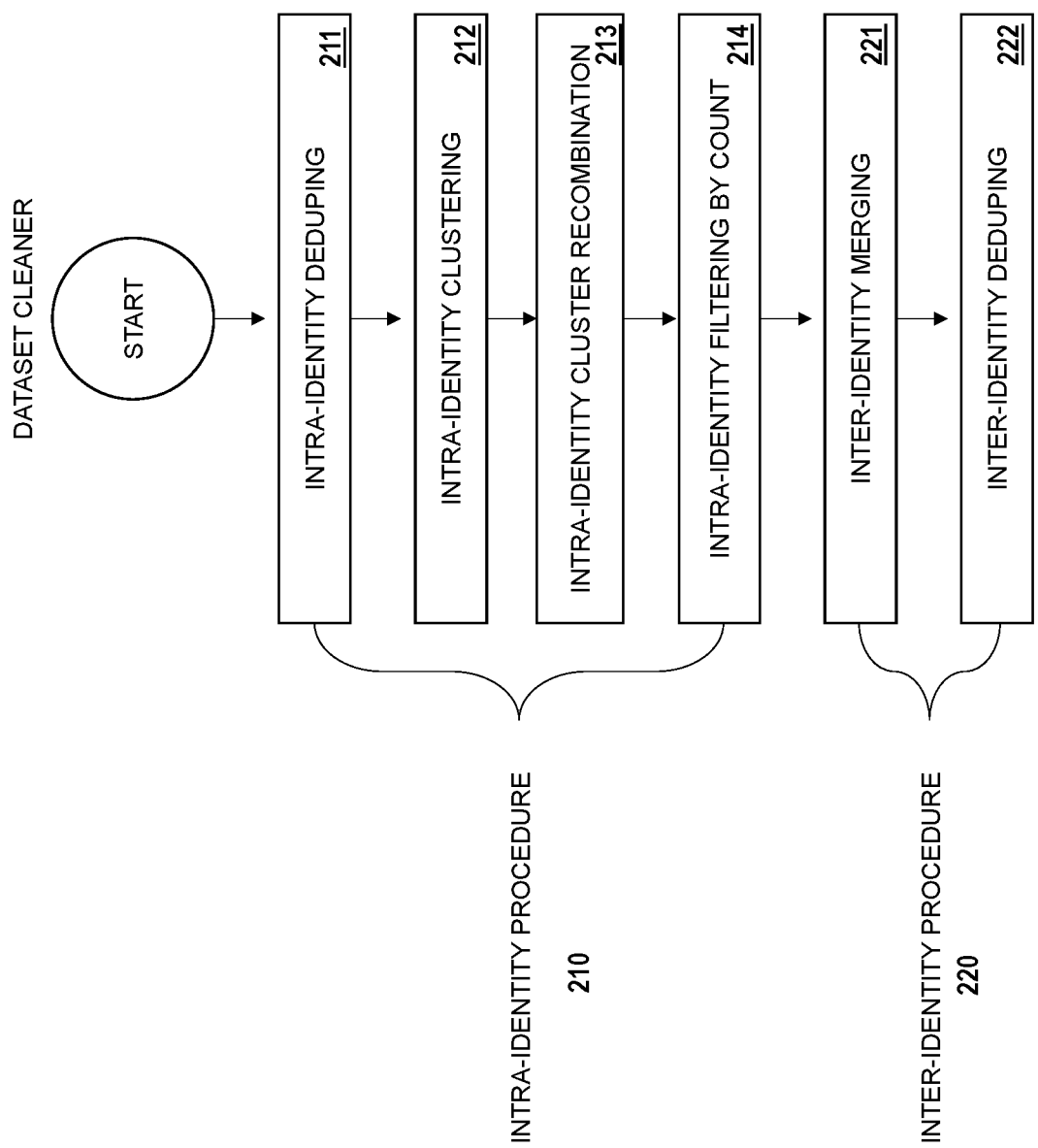
FIG. 2 shows an example intra-/inter-identity data cleaning process.

Given dirty facial images data, where there are noises within an identity label and across identities, there is a need to clean facial images data to reduce or remove the noises. As shown in FIG. 2, the cleaning process is based on calculating the pairwise cosine similarity scores between feature vectors generated by a certain good-quality and iteratively improving neural network that was previously trained to perform facial recognition. Cosine similarities may vary between −1 and 1, the larger, the more similar. Depending on the number of elements (n) for comparison, the number of unique comparisons follows the rule of combination, forming a triangle of an n×n matrix without the diagonal elements. Off-the-shelf clustering methods (dbscan, agglomerative clustering, etc.), or graph theory community detection methods (Chinese Whispers, Louvain, etc.) could be applied to cluster the faces, in order to perform deduping or identity separation and/or merging. They are applied in the following order, but there could be other orders that are effective.

Cluster vectors may be generated based on a center or average of a "cluster" of other individual vectors. To define a cluster of individual vectors, a plurality of vectors are generated by a facial recognition neural network. Cluster vectors may be generated based on a center or average of a "cluster" of other individual vectors. To define a cluster of individual vectors, a plurality of vectors are generated by a facial recognition neural network. For example, a cluster of vectors may be recognized by determining subsets of the plurality of vectors. The vectors in the subset have small n-dimensional Euclidean distances from one another relative to their distances from other vectors in the overall available plurality of vectors. Each subset of the plurality of vectors is defined as a "cluster," as they may be thought of as clustered together, nearby to one another, in n-dimensional vector space. A vector that represents the center or average of each cluster is then generated. This may be accomplished, for example, by using a radial basis function. The vectors defining the center of each respective cluster constitute the n-dimensional cluster vectors that are used to calculate an n-dimensional Euclidean distance from the n-dimensional vector generated as output by the facial recognition neural network computations.

With reference to FIG. 2, a facial image cleaning process may include an intra-identity facial image cleaning procedure 210 and/or an inter-identity facial image cleaning procedure 220. When performing the intra-identity facial image cleaning procedure 210, at 211 the system may start with intra-identity deduping to remove highly similar or identical facial images which may skew the resulting neural network models. After removal of highly similar or identical facial images, the system continues with intra-identity clustering 212, during which facial images attributed to a pre-assigned identity label are clustered into two or more identities, which could be true identities.

At 213, the system may perform intra-identity cluster recombination. During this step, clusters with high similarity are recombined due to the fact that clusters having small variations may nevertheless correspond to the same identity.

Additionally, to limit or eliminate the identities with very low face counts per identity such that the chance of skewing the resulting neural network can be reduced, the method may also include performing intra-identity filtering based on face count 214.

After the intra-identity facial image cleaning procedure 210, several or many actual identities may emerge from a subset of facial images that is previously assigned to one identity label. For example, a subset of facial images that is initially assigned to one identity label, such as an image uploader, may be clustered and reassigned to multiple or many actual identities, such as the image uploader's friends.

To increase the cleanness of facial image datasets, the system may further perform inter-identity procedure 220. The system starts at 221 by performing inter-identity merging, given that fact some subsets of facial images of the same identity could be mistakenly assigned to different identities. In addition, the system may perform inter-identity deduping 222. At this step, facial images that are not similar enough to be merged and yet too similar to skew training of neural network models will be deduped (i.e., only one of such facial images will be retained).

Intra-Identity Facial Image Data Cleaning

Intra-identity deduping: A very high similarity threshold (e.g., between about 0.9 and about 0.95) is applied to sift out greatly similar faces. The value was chosen from an adequate amount of human review of the deduping results. Highly similar facial images are almost always the same underlying pixels with varying degrees of random effects, jittering, color distortion, cutouts, etc. They are removed at this stage to provide a more accurate count of high-variance faces within an identity, resulting in a leaner dataset. This type of small random variation can be recreated with augmentation methods during training.

Intra-identity clustering: A relatively high similarity threshold (between about 0.45 and about 0.5) is applied to group faces into clusters. With such a high threshold, feature vectors from the neural networks indicate the faces belong to the same actual identity within each cluster with a very low false-positive rate (such as 1e-6 from large scale testing). Notably, different clustering or community detection algorithms behave differently with the same threshold, so experiments and human review are critical to determining an ideal threshold to use. These identity clusters include the identity label subject/image uploader or their friends. All clusters are meaningful input data for training.

Intra-identity cluster recombination: Repeated experiments indicate that those identity clusters derived from clustering or community detection algorithms are often too fine-grained, and mistakenly assign different poses, styles, lighting conditions of the same identity into two or more clusters with varying sizes. Not being able to recombine them leads to weak algorithms incapable of resolving irrelevant differences that still correspond to the same identity, thus being detrimental to algorithm performance. Therefore, similarity scores are calculated between these clusters, treating each cluster as an element, and applying a second-order clustering over these clusters. There can be multiple ways to compute the similarity scores between clusters, such as sampling from each cluster and computing the product of similarity scores, then using the minimum, average, or maximum, or simply combining the feature vectors of clusters (centroid vectors) and compute the similarity scores between them. A value between about 0.45 and about 0.5 yields ideal recombination, as confirmed by human review. After this step, each recombined cluster is attributed to an actual identity. Therefore, from one identity label, there could emerge multiple actual identities.

Filtering at count of faces per identity: In some scenarios, there would be a great number of identities with only one or two facial images. Including them in full would skew the training into being less tolerant of variations. Thus, there is a need to limit or eliminate the identities with very low face counts per identity. For example, the identities with two or fewer face counts per identity will be eliminated.

In one aspect, this disclosure provides a method for generating a facial image dataset for training a facial recognition model, comprising: (a) receiving a set of facial images comprising a plurality of subsets of facial images, each of the subsets of facial images is associated with a pre-assigned identity label; (b) performing intra-identity facial image deduping for each subset of facial images by: determining pairwise intra-identity facial image similarity scores between the facial images in the each subset of facial images; identifying two or more facial images within the each subset of facial images as duplicate facial images associated with the same identity label if the two or more facial images have an intra-identity similarity score greater than or equal to an intra-identity similarity threshold value; and retaining only one of the duplicate facial images after removing the rest of the duplicate facial images; (c) performing intra-identity clustering by applying a first clustering similarity threshold to group the deduped facial images in the each subset of facial images into a plurality of clusters; and (d) performing intra-identity second-order clustering by determining pairwise cluster similarity scores between centroid vectors of clusters and combining clusters having pairwise cluster similarity score greater than or equal to a second clustering similarity threshold to obtain an intra-identity cleaned facial image dataset, wherein the combined clusters and remaining uncombined clusters are respectively associated with a plurality of actual identities.

In some embodiments, the identity label is selected from a username, a search engine keyword, and an image uploader.

In some embodiments, the step of identifying two or more facial images within each subset of facial images as duplicate facial images associated with the same identity label is performed by an existing neural network facial recognition model. In some embodiments, the step of determining pairwise facial image similarity scores comprises determining cosine similarity scores between feature vectors generated by an existing neural network facial recognition model.

In some embodiments, a convolutional neural network (CNN) can be used as the neural network. In one embodiment, a deep convolutional neural network (DCNN) is pre-trained for extracting generic face features on a large-scale face recognition dataset. The features are fine-tuned to adapt to the appearance changes, pose, and scale, or other variations of different faces presented in a facial image. CNNs can be trained on a large-scale face recognition dataset to well classify different identities, resulting in discriminative and compact features with good generalization. The hidden identity features can be well generalized to other tasks (e.g., face verification) and identities outside the training set. Some embodiments can include deep (e.g., greater than five layers) neural networks.

In some embodiments, the face recognition neural network may be a CNN trainable in connection with a softmax loss function or variant thereof.

In some embodiments, the method further comprises iteratively training and updating the existing neural network facial recognition model using the intra-identity cleaned facial image dataset.

In some embodiments, the step of determining pairwise facial image similarity scores further comprises generating an intra-identity similarity matrix. In some embodiments, the similarity threshold value is between about 0.9 and about 0.95. In some embodiments, the first clustering similarity threshold is between about 0.45 and about 0.5. In some embodiments, the second clustering similarity threshold is between about 0.45 and about 0.5.

In some embodiments, the combined clusters and the remaining uncombined clusters each correspond to an actual identity, and wherein the actual identity corresponds to the pre-assigned identity label themselves, their friends thereof, or their photography subjects.

In some embodiments, the combined clusters and the remaining uncombined clusters are each assigned new identity labels and become new subsets of facial images.

In some embodiments, the method comprises removing the actual identity cluster with face counts lower than three faces (e.g., 0, 1, or 2 faces).

In some embodiments, the method further comprises preprocessing the facial images, wherein preprocessing comprises detecting a face in a facial image, cropping, resizing, gradation conversion, median filtering, histogram equalization, or size normalized image processing.

In another aspect, this disclosure provides a system for generating a facial image dataset for training a facial recognition model. The system comprises a non-transitory, computer-readable memory; one or more processors; and a computer-readable medium containing programming instructions that, when executed by the one or more processors, configure the system to: (i) receive a set of facial images comprising a plurality of subsets of facial images, each of the subsets of facial images is associated with a pre-assigned identity label; (ii) perform intra-identity facial image deduping for each subset of facial images by: determining pairwise intra-identity facial image similarity scores between the facial images in the each subset of facial images; identifying two or more facial images within the each subset of facial images as duplicate facial images associated with the same identity label if the two or more facial images have an intra-identity similarity score greater than or equal to an intra-identity similarity threshold value; and retaining only one of the duplicate facial images after removing the rest of the duplicate facial images; (iii) perform intra-identity clustering by applying a first clustering similarity threshold to group the deduped facial images in the each subset of facial images into a plurality of clusters; and (iv) perform intra-identity second-order clustering by determining pairwise cluster similarity scores between centroid vectors of clusters and combining clusters having pairwise cluster similarity score greater than or equal to a second clustering similarity threshold to obtain an intra-identity cleaned facial image dataset, wherein the combined clusters and remaining uncombined clusters are respectively associated with a plurality of actual identities.

In some embodiments, the identity label is selected from a username, a search engine keyword, and an image uploader.

In some embodiments, the step of identifying two or more facial images within each subset of facial images as duplicate facial images associated with the same identity label is performed by an existing neural network facial recognition model. In some embodiments, the step of determining pairwise facial image similarity scores comprises determining cosine similarity scores between feature vectors generated by an existing neural network facial recognition model.

In some embodiments, the system is further configured to iteratively train and update the existing neural network facial recognition model using the intra-identity cleaned facial image dataset.

In some embodiments, the step of determining pairwise facial image similarity scores further comprises generating an intra-identity similarity matrix. In some embodiments, the similarity threshold value is between about 0.9 and about 0.95. In some embodiments, the first clustering similarity threshold is between about 0.45 and about 0.5. In some embodiments, the second clustering similarity threshold is between about 0.45 and about 0.5.

In some embodiments, the combined clusters and the remaining uncombined clusters each correspond to an actual identity, and wherein the actual identity corresponds to the pre-assigned identity label themselves, their friends thereof, or their photography subjects. In some embodiments, the combined clusters and the remaining uncombined clusters are each assigned new identity labels and become new subsets of facial images.

In some embodiments, the system is further configured to remove the actual identity cluster with face counts lower than three faces.

In some embodiments, the system is further configured to preprocess the facial images. In some embodiments, preprocessing comprises detecting a face in a facial image, cropping, resizing, gradation conversion, median filtering, histogram equalization, or size normalized image processing.

The term "image" or "images," as used herein, refers to single or multiple frames of still or animated images, video clips, video streams, etc. Preprocessing may include detecting a facial image in the image of the subject. Preprocessing may also include cropping, resizing, gradation conversion, median filtering, histogram equalization, or size normalized image processing. In some embodiments, the system may resize the photo or the videos according to a threshold value (e.g., maximum size in kilobytes, megabytes or gigabytes, maximum or minimum resolution in dots per inch (DPI) or pixels per inch (PPI)). In some embodiments, the system may resize the photo or the videos based on the transmission rate of the network and the links.

In some embodiments, the system may perform additional processing steps to the captured images or videos to digitalize the data file and optionally compress it into a convenient compressed file format and send it to a network protocol stack for subsequent conveyance over a local or wide area network. Typical compression schemes include MPEG, JPEG, H.261 or H.263, wavelet, or a variety of proprietary compression schemes. A typical network topology is the popular Ethernet standard, IEEE 802.3, and may operate at speeds from 10 Mb/s to 100 Mb/s. Network protocols are typically TCP/IP, UDP/IP, and may be Unicast or Multicast as dictated by the system requirements.

Inter-Identity Facial Image Data Cleaning

During data collection, faces from the same actual identity are often wrongly labeled as two different identities. Accordingly, it is necessary to either merge or delete all but one that shows high similarity scores. It is also the case when datasets from two different sources are merged. Similar to intra-identity calculations, there can be multiple ways for inter-identity calculations, such as sampling to use the minimum, average, or maximum, or scores between centroid vectors. However, unlike intra-identity similarity calculations on the scale of $10^3$ calculations, there are far more calculations needed to complete the similarity matrix, due to an exponentially increased combination, on the scale of $10^{12}$, from millions of identities. This poses severe demand over the computing resources to calculate the scores and storage resources to save them. All downstream processing carries the consequences of this large scale. Here an approach to solving these problems is provided.

Figure 3:
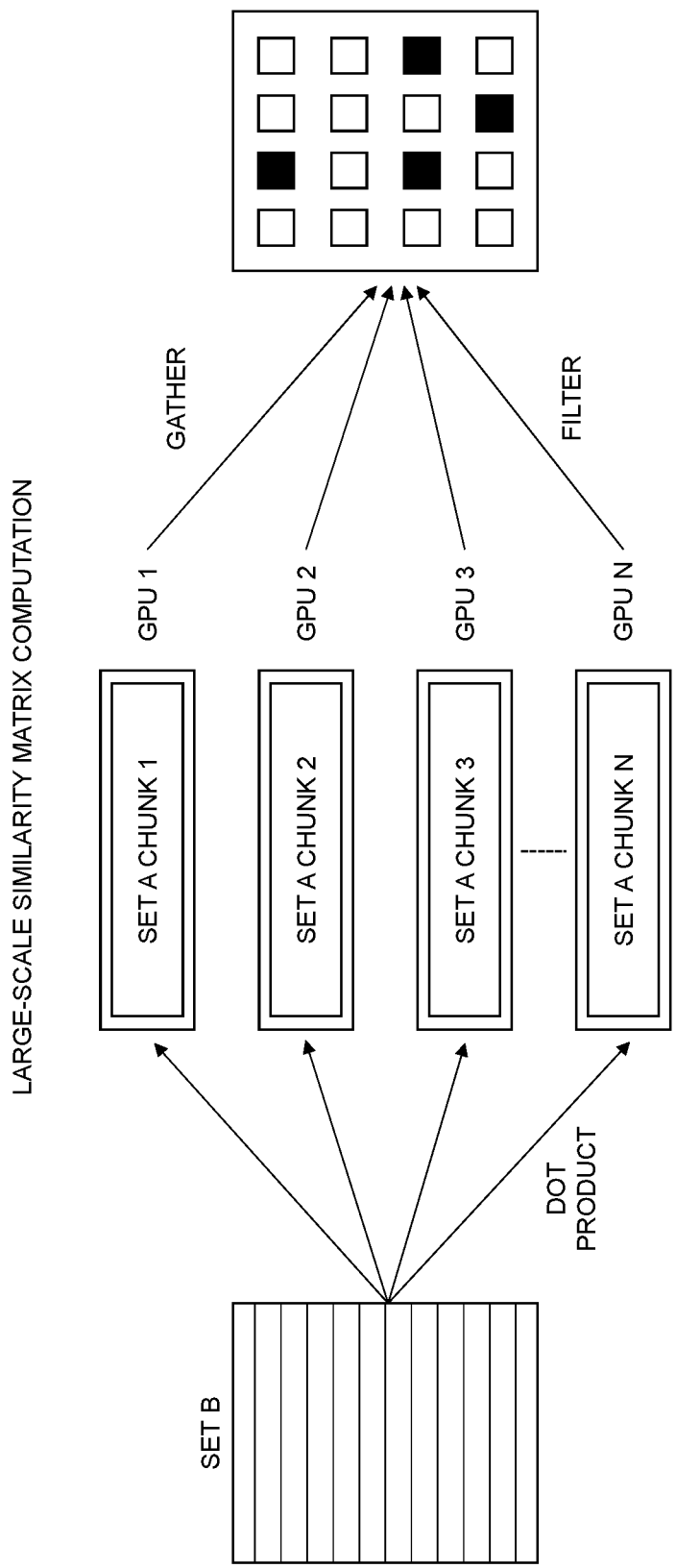
FIG. 3 shows large-scale similarity matrix computation.

As shown in FIG. 3, to accelerate computation, the feature vectors are moved to many GPUs in chunks the same as the number of GPUs to form Set A. They are then iterated over the feature vectors from Set B to parallelly compute dot products with chunks of Set A on the GPUs, and the results are collected altogether. Set A and B can be the same if the same dataset is operated on, or different if two different datasets are to be merged. When it is the same dataset, only the triangle of the similarity matrix without the diagonal elements needs to be computed, whereas for two different datasets, the entire matrix needs to be computed. To save storage space, filtering is applied with a similarity threshold of a medium value such as 0.2, and only the identity pairs that exceed such a threshold are recorded, creating a sparse representation of the similarity matrix. The comparison data is then streamed into a serialized format for future retrieval in float 16 format. By carrying out computation this way, a task that would take multi-CPU supercomputers months to complete and petabytes to store, is transformed into one that takes one day or two and a few gigabytes, substantially reducing time and storage, while making all downstream processing more efficient yet relevant.

Inter-identities merging: Given that a lot more identities come with a larger false positive rate, a higher threshold is applied for merging two identities. Extensive human review is required to arrive at an ideal value, such as about 0.5 or above, seems adequate.

Inter-identities deduping: There are identities that are above the threshold suitable for merging but still above the threshold that indicates close similarity (such as 0.4). They are typically faces belonging to twins and very young children. Without a more refined way to further separate them, all but one are deleted in order not to confuse the training process.

After the processes described above, the dataset is clean based on the feature vectors generated by neural networks in this iteration. After a new neural network is trained with the cleaned and augmented (see below) dataset, the feature vectors are regenerated with the new neural network, and the process is repeated. It has been shown to a certain extent this iterative approach leads to an ever-improving performance of the algorithm.

In some embodiments, the method further comprises performing inter-identities merging by: determining pairwise inter-identity similarity scores between centroid feature vectors of different subsets of facial images that are associated with different identity labels; and merging two or more subsets of facial images having an inter-identity similarity score greater than or equal to a first inter-identity similarity threshold value to obtain an inter-identity cleaned facial image dataset.

In some embodiments, the method further comprises performing inter-identities deduping by: (i) determining pairwise inter-identity facial image similarity scores between centroid feature vectors of different subsets of facial images that are associated with different identity labels; (ii) identifying two or more subsets of facial images as duplicate subsets of facial images associated with the same identity label if the two or more subsets of facial images have an inter-identity similarity score greater than or equal to a second inter-identity similarity threshold value; and (iii) retaining only one of the duplicate subsets of facial images after removing the rest of the duplicate subsets of facial images.

In some embodiments, the first inter-identity similarity threshold value is about 0.5 or above. In some embodiments, the second inter-identity similarity threshold value is between about 0.4 and about 0.45.

In some embodiments, the step of determining the pairwise facial image similarity scores between facial images comprises determining cosine similarity scores between feature vectors generated by an existing neural network facial recognition model.

In some embodiments, the step of determining pairwise facial image similarity scores further comprises generating an inter-identity similarity matrix.

In some embodiments, the step of identifying two or more facial images within the different subsets of facial images as duplicate facial images is performed by an existing neural network facial recognition model.

In some embodiments, the method comprises iteratively training and updating the existing neural network facial recognition model using the inter-identity cleaned facial image dataset.

In some embodiments, the method further comprises distributing feature centroid vectors in chunks to a plurality of graphics processing units (GPUs), wherein each chunk is distributed to one GPU. In some embodiments, an inner product between the centroid vectors from the same set and the chunks in the GPUs become similarity scores, and wherein the similarity scores below a threshold are removed and the remaining similarity scores are streamed into a file to form a sparse matrix representation for efficiency of storage and downstream processing. In some embodiments, the threshold is between about 0.2 and about 0.4.

In some embodiments, the system is further configured to perform inter-identities merging by: determining pairwise inter-identity similarity scores between centroid feature vectors of different subsets of facial images that are associated with different identity labels; and merging two or more subsets of facial images having an inter-identity similarity score greater than or equal to a first inter-identity similarity threshold value to obtain an inter-identity cleaned facial image dataset.

In some embodiments, the system is further configured to perform inter-identities deduping by: (i) determining pairwise inter-identity facial image similarity scores between centroid feature vectors of different subsets of facial images that are associated with different identity labels; (ii) identifying two or more subsets of facial images as duplicate subsets of facial images associated with the same identity label if the two or more subsets of facial images have an inter-identity similarity score greater than or equal to a second inter-identity similarity threshold value; and (iii) retaining only one of the duplicate subsets of facial images after removing the rest of the duplicate subsets of facial images.

In some embodiments, the first inter-identity similarity threshold value is about 0.5 or above. In some embodiments, the second inter-identity similarity threshold value is between about 0.4 and about 0.45.

In some embodiments, the step of determining the pairwise facial image similarity scores between facial images comprises determining cosine similarity scores between feature vectors generated by an existing neural network facial recognition model.

In some embodiments, the step of determining pairwise facial image similarity scores further comprises generating an inter-identity similarity matrix.

In some embodiments, the step of identifying two or more facial images within the different subsets of facial images as duplicate facial images is performed by an existing neural network facial recognition model.

In some embodiments, the system is further configured to iteratively train and update the existing neural network facial recognition model using the inter-identity cleaned facial image dataset.

In some embodiments, the system is further configured to distribute feature centroid vectors in chunks to a plurality of graphics processing units (GPUs), wherein each chunk is distributed to one GPU. In some embodiments, an inner product between the centroid vectors from the same set and the chunks in the GPUs become similarity scores, and wherein the similarity scores below a threshold are removed and the remaining similarity scores are streamed into a file to form a sparse matrix representation for efficiency of storage and downstream processing. In some embodiments, the threshold is between about 0.2 and about 0.4.

Augmentation

Figure 4:
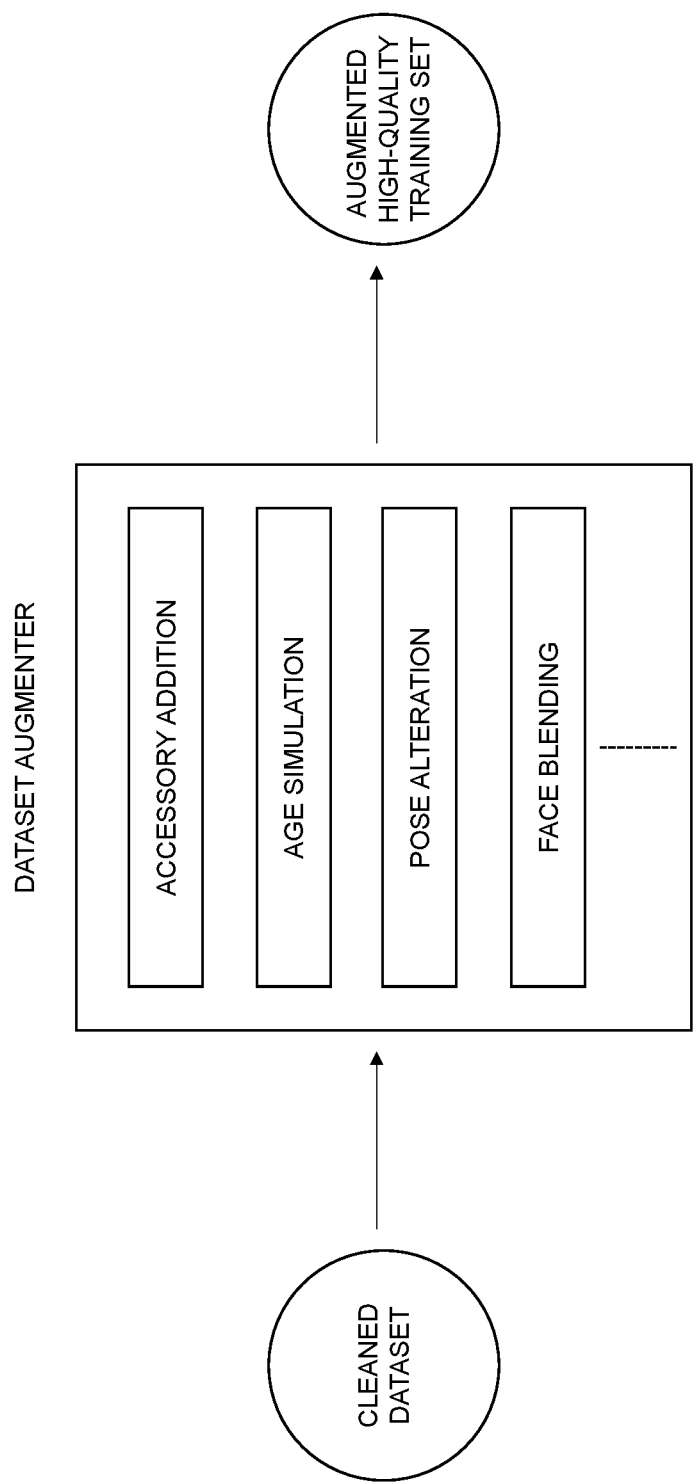
FIG. 4 shows an example augmentation process to increase variations of facial images.

It is ideal for each identity to have a very rich and wide spectrum of variations for facial images, under natural occurrences, such as accessories (e.g., smiling, blinking, or wearing glasses, hats, or masks), lighting variations, and aging. However, it is not always feasible to obtain such high quality datasets. This problem is addressed with advanced augmentation methods as described below. It should be noted that these methods are different from random augmentations such as mirroring, jittering, color distortion, cutouts that can be easily applied during a training process. As shown in FIG. 4, they need to go through well-studied and implemented pipelines involving other neural networks, thus suitable to pre-generate offline and be combined with the original dataset. The goal is to increase variations within an identity in a meaningful way, to simulate natural occurrences, and to preserve high fidelity to the underlying identity.

Accessory addition: 3D landmark detection can be used to blend facial images with accessories such as glasses, hats, and masks on UV maps, a flat representation. This has been proven to be the ideal method for the task. As used herein, "3D landmark" refers to a landmark detected in a 3D face model. The term "UV maps," as used herein, refers to may refer to a 2D mesh representation of mapping performed from a 2D representation (e.g., a 2D design document or production texture) of 3D object, e.g., face, to a 3D model (or a 3D mesh representation of a 3D model), e.g., a 3D face model.

Aging simulation: Generative neural networks can be used to perform age simulation. The latent space is explored to determine the path for altering the age of the subject. The challenge is to select neural networks and train them to preserve the fidelity of the underlying identity, rather than appearing average and aesthetically pleasing. As used herein, the term "generative reconstructor neural network" refers to one or more neural networks that generate a facial image reconstruction based on selected facial images.

Pose alteration: Generative neural networks can be used to perform post alteration in similar ways described above. High fidelity is key. The latent space is explored to determine the path for altering the pose of the subject, from frontal view, profile view, and other pitch, yaw and roll angles.

Face blending: With two facial images, a transition path from the first to the second can be generated. The points in between can be treated as meaningful variations of the same underlying identity. The latent space is explored to find faces that are along the transition path that still belong to the same underlying identity, but these blended faces create variations for the neural network to learn during training.

In some embodiments, the method further comprises augmenting facial images in the cleaned facial image dataset by adding one or more variations selected from accessory addition, lighting variations, age simulation, pose alteration, and face blending.

Similarly, in some embodiments, the system as disclosed is further configured to augment facial images in the cleaned facial image dataset by adding one or more variations selected from accessory addition, lighting variations, age simulation, pose alteration, and face blending.

Methods and System for Training a Neural Network Facial Recognition Model

Efficient Distributed Trainer

Figure 5:
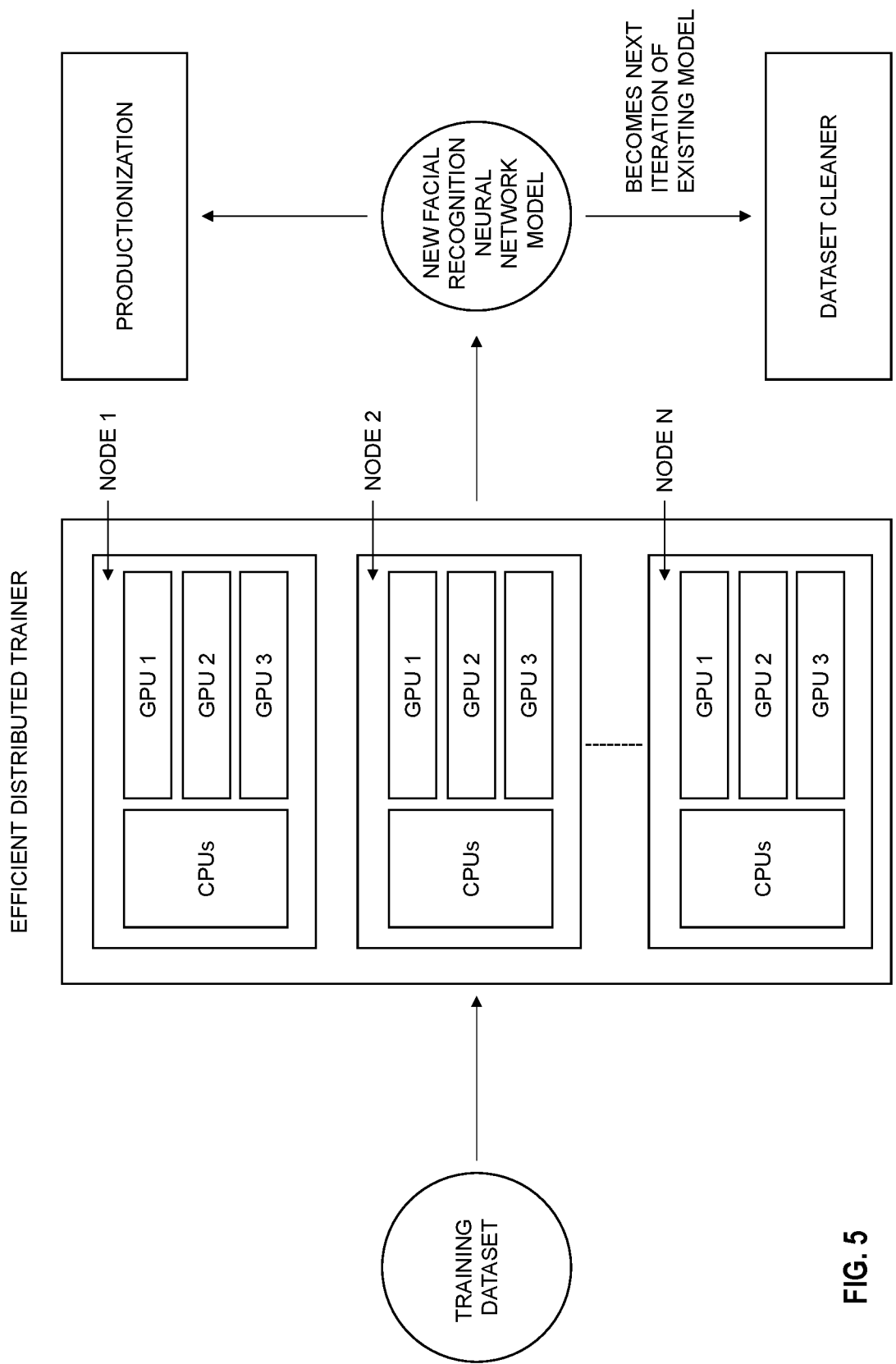
FIG. 5 shows an example efficient distributed trainer for neural networks.

With a large high quality dataset, clean, and high intra-identity variation, the facial recognition neural network needs to be trained efficiently. As datasets get larger and larger, neural networks need to be deeper and larger to extend their distinguishing ability. Moreover, the facial recognition neural network needs to be trained iteratively and frequently without incurring prohibitive costs and drastic delays. Here, shown in FIG. 5, a combination of techniques is described that cut training time from months to days and training cost from tens of thousands of dollars to a fraction of it.

Data Parallel, Model Parallel, Mixed-Precision and Zero-Redundancy

Figure 6:
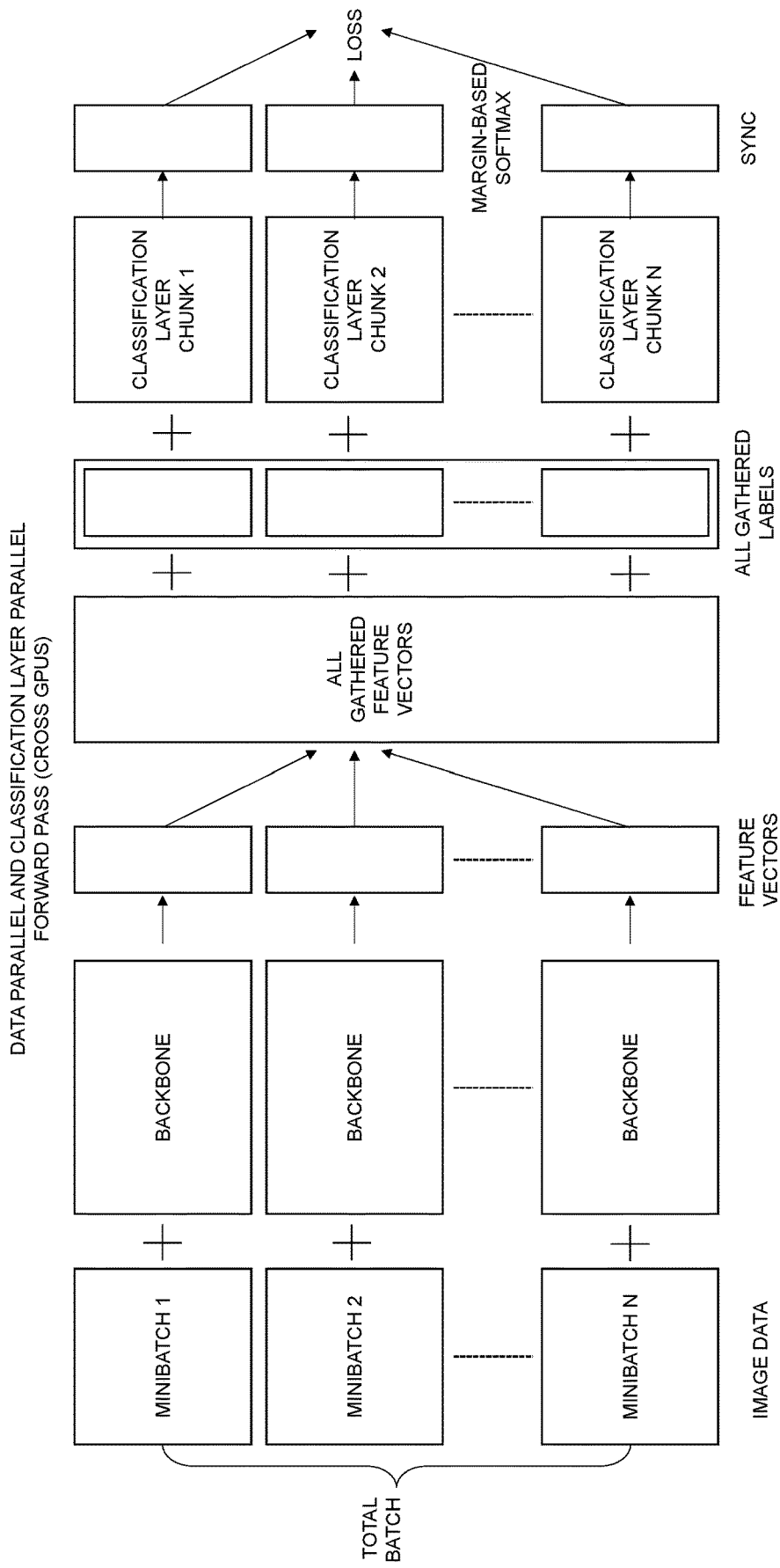
FIG. 6 shows an example process for data parallelization and classification layer parallelization.

In the domain of distributed deep learning, it is well known to use a basic data parallel approach to send different batches of data to different GPUs across many nodes. This effectively enlarges the total effective batch size, thus shortening the training time in an almost linear manner, at about the same total cost. However, as the number of identities approaches millions scale, the classification layer becomes increasingly big, to not be able to fit in the limited memory space of even the data-center grade contemporary GPUs. As shown in FIG. 6, one way to get around this is to parallelize the classification (last fully connected) layer onto many GPUs. Each GPU stores only a chunk of the identities, and synchronization primitives, such as all gather or all reduce, can be used to communicate the various inputs, labels, and outputs in the critical path. This is proven to work, until the number of identities gets even larger. There are 7.7 billion people currently living in the world, and more before. A statistical approach was devised to selectively sample the non-matching identities in the classification layer by a small fraction (e.g., 10%, 5%), while keeping all the matching identities during a forward pass with the data batch, and it has been shown to only minimally affect the loss function and lead to trivial final accuracy loss.

As good as the existing approaches get, when the neural network backbone itself gets deeper and larger, GPU memory re-emerges as the hard bottleneck. Mixed-precision (FP16) has been tried and matured to cut resource usage and computation in half while preserving accuracy. Further, a recent approach, Zero-redundancy, was suggested to parallelize the optimizer states and gradients across GPUs. It has limited use here as the space saved contributes to only a small fraction of the memory usage. Another obvious option is to reduce the per-GPU batch size. However, smaller batches lead to issues with suboptimal normalization, and more importantly, more frequent synchronization across GPUs and nodes and optimization passes lead to much reduced training speed, oftentimes severely affecting progress.

Gradient Accumulation with Partial Classification Layer

Figure 7:
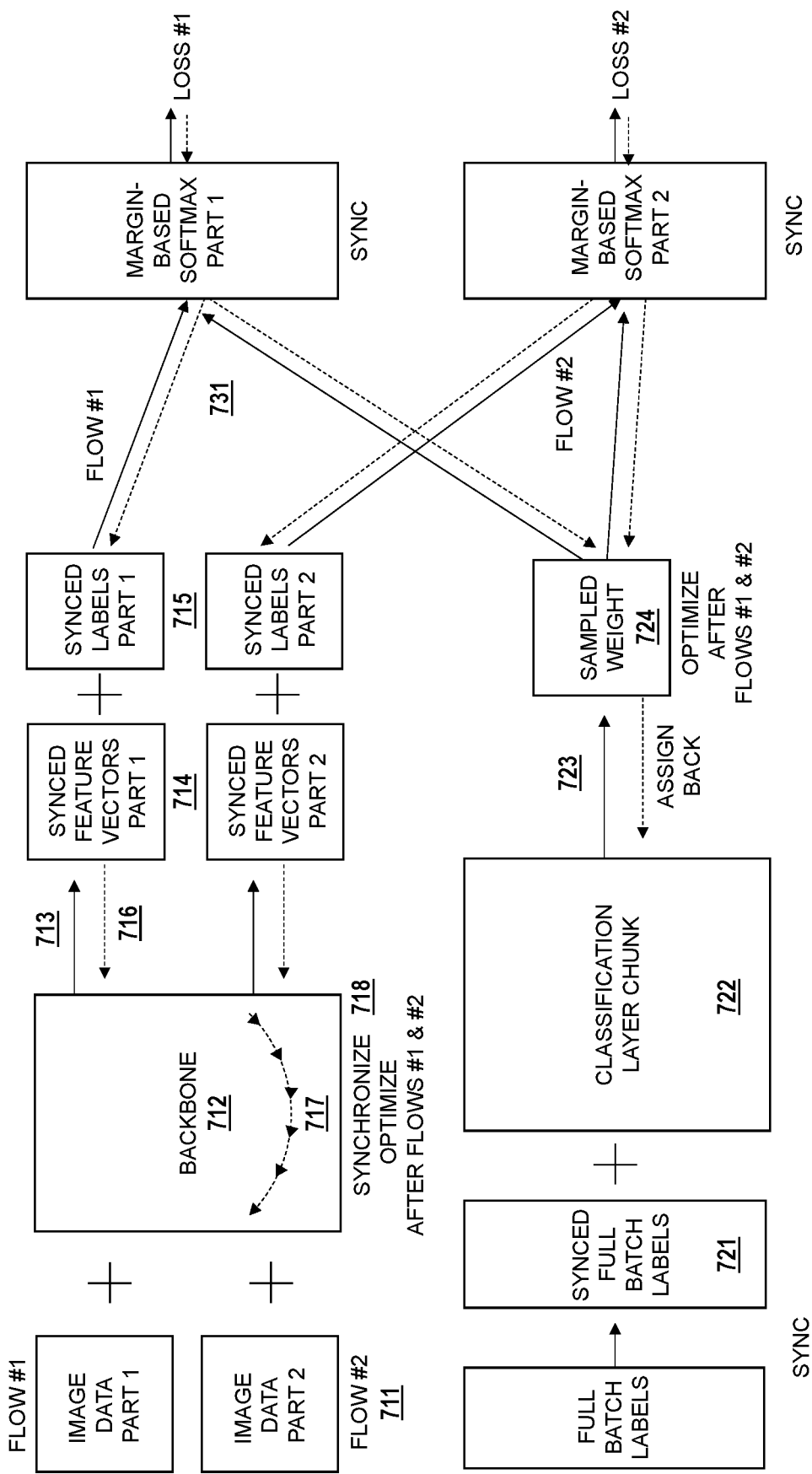
FIG. 7 shows an example process for gradient accumulation with a partial classification layer.

A similar way to reduce GPU footprints is gradient accumulation, as shown in FIG. 7. This allows one to send multiple smaller batch parts in the forward-backward pass of the neural network, but only synchronize the backbone once at the very end and run the optimizer step once. This is almost equivalent to a larger full batch, with only a small speed penalty, unlike simply reducing batch sizes. However, it was challenging to mix this technique with the classification layer parallelization, and more challenging with partial sampling of the layer. This problem is solved with the following process with reference to FIG. 7.

1. As an example, a full batch is chunked into two parts at 711.
2. The full batch labels are used to get synchronized labels at 721 and perform classification layer 722 sampling at 723, while keeping track of the normalized partial weight 724 as a result of the sampling at 723.
3. Forward the first part of the chunked image batch data through the network backbone 712 as illustrated at 713 to obtain feature vectors for this part.
4. Synchronize the resulting feature vectors to obtain the synchronized feature vectors 714, and split the previously synchronized labels to get the corresponding labels 715 for the chunked part. Run forward-backward at 731 to compute the loss and gradients for the sampled weight 724 and feature vectors 714.
5. Run backward at 716 from the feature vectors 714 with the gradients calculated above to back-propagate and derive gradients 717 for the backbone parameters 712 in each layer.
6. Apply steps 3-5 to the second part of the chunked image batch data. This time gradients get to accumulate over the first pass for both the sampled weight 724 and the backbone parameters 712.
7. Synchronize all the backbone parameters across all GPUs at 718.
8. Run the optimizer update for the sampled weight 724 as well as the backbone parameters 712.
9. Assign back the updated sampled weight 724 and its optimizer states to the classification layer 722.
10. Repeat steps 1-9 for the next full batch.

As such, the same effective batch size can be used with a small penalty to speed, continuing with scaling to larger datasets and deeper neural networks.

Selective Activation Checkpointing

Figure 8:
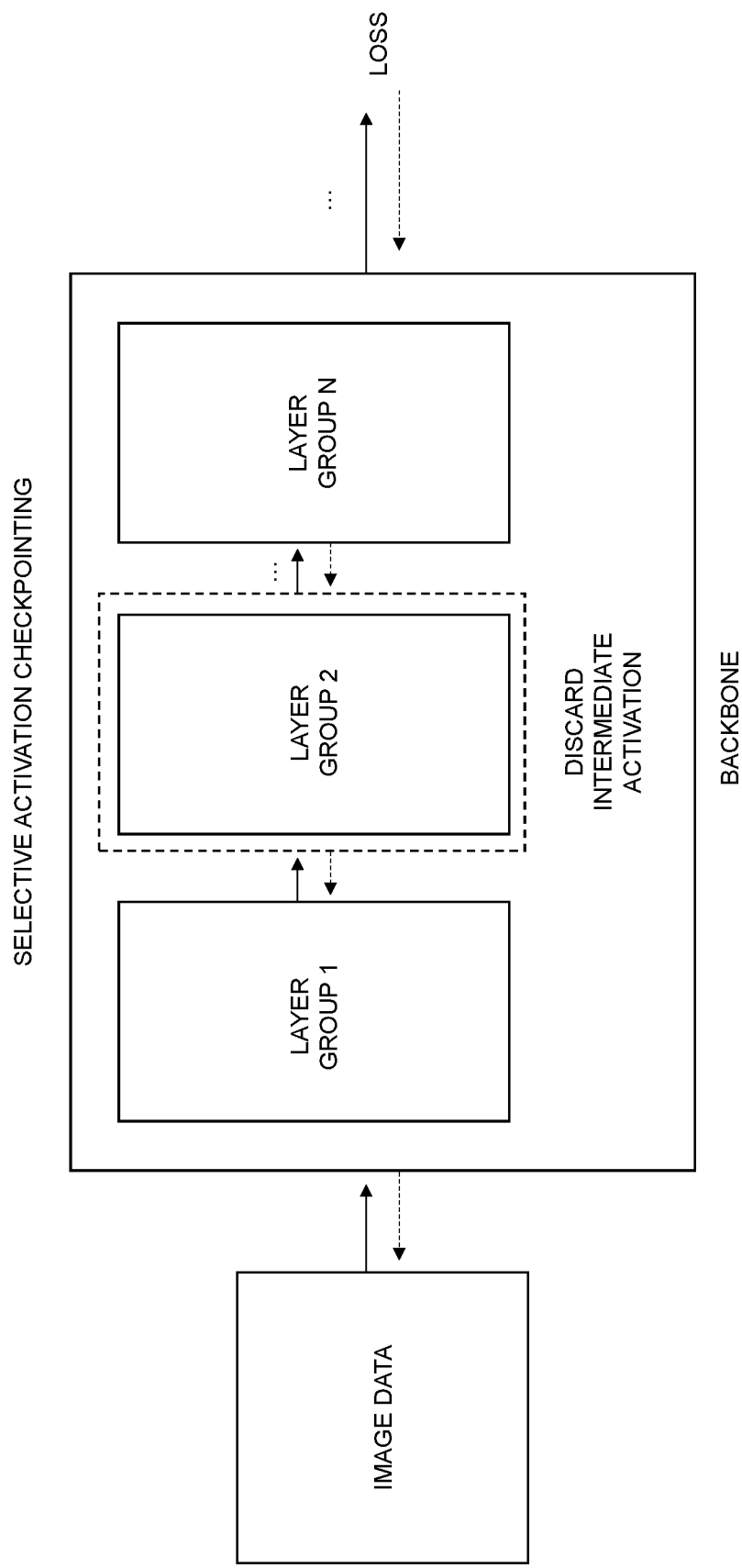
FIG. 8 shows an example process for selective activation checkpointing.

Yet another approach for preserving large effective batch sizes while reducing GPU memory consumption is activation checkpointing, as shown in FIG. 8. This approach practically discards the activation of each layer in the backbone for the selected layers, a big part of the large-batch forward pass memory usage, and recalculates them during the backward pass, trading speed to get a lower memory footprint. This, however, will result in large speed penalties. Thus, it is only applied in the initial few layers where input sizes are large and convolutional units are plentiful, leading to better speed-memory tradeoffs under practical memory constraints.

Learning Rate Scheduling and Layer-Adaptive Rate Scaling (LARS)

There is a limit to increasing the total batch size. As it approaches 8192 and higher, the linear scaling rule for learning rates starts to fall apart. The large learning rate leads to severe instability in the optimizer. Thus, layer-adaptive learning rate scaling with known learning rate scheduling such as polynomial decay is used to continue getting scaling advances, cutting training time even further for very large datasets and deep models.

Iterative Data Preparation and Training Cycles

Figure 9:
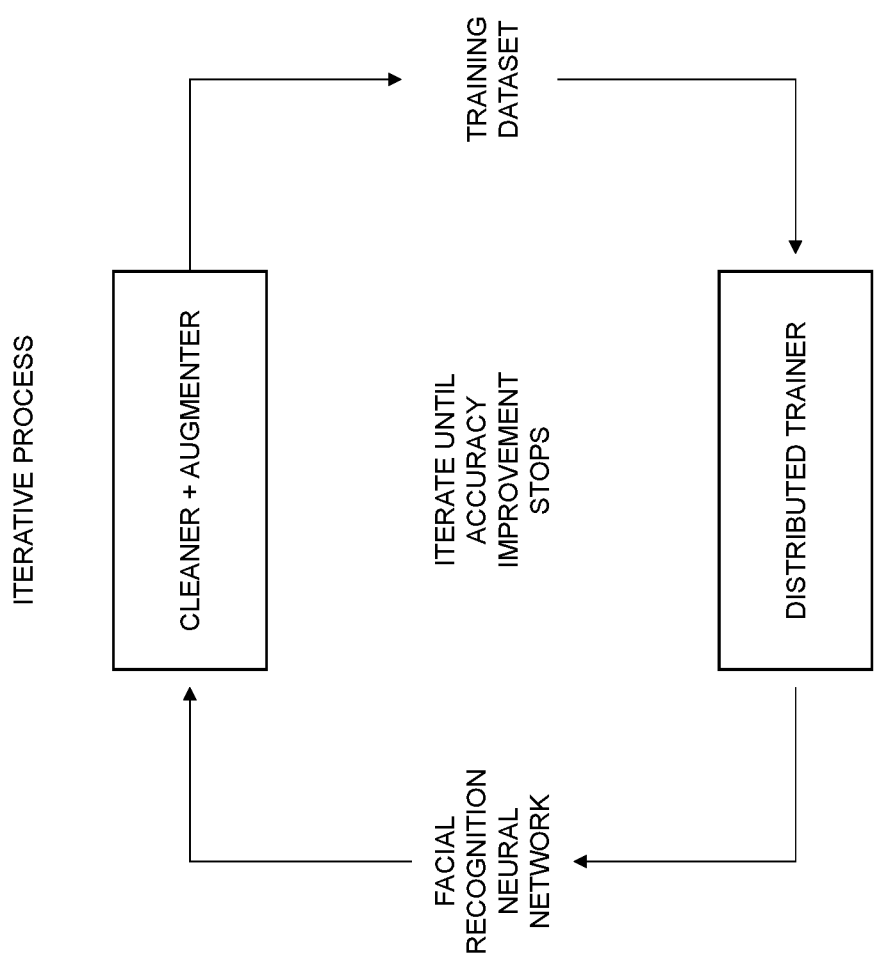
FIG. 9 shows an example interactive data preparation process and training cycles.

As mentioned in previous sections, a newly trained neural network with the cleaned and augmented dataset leads to superior feature vectors for training data cleaning and, in turn, leads to training a more accurate neural network (FIG. 9). It has been shown to a certain extent that this iterative approach leads to an ever-improving performance of the algorithm. This approach is adopted to bootstrap the facial recognition task.

In one aspect, this disclosure provides a method for training a neural network facial recognition model. The method comprises (a) receiving a batch of facial image data and dividing the batch into two or more parts; (b) performing label synchronization and classification layer sampling using full batch labels and keeping track of the normalized weight as a result of the sampling process; (c) forwarding a first part of the batch through a neural network backbone distributed in a plurality of GPUs; (d) synchronizing resulting feature vectors and splitting previously synchronized labels to obtain corresponding labels for the first part of the batch and running forward-backward with sampled weight to compute loss and gradients for sampled weight and feature vectors; (e) running backward from the feature vectors with the gradients to back-propagate and derive gradients for backbone parameters in each layer; (f) performing steps (c) to (e) for the part of the two or remaining parts of the batch to allow gradients to accumulate over the first pass for both the sampled weight and the backbone parameters; (g) synchronizing all the backbone parameters across all of the plurality of GPUs; (h) running an optimizer for the sample weight and the backbone parameters; and (i) assigning back the sampled weight and optimizer states to the classification layer.

In some embodiments, the batch of facial image data is generated according to the method described herein. In some embodiments, the neural network facial recognition model is used in the method described herein to generate the feature vectors of the facial image dataset.

In some embodiments, the method comprises discarding activations of one or more initial layers in the backbone during the forward pass and recomputing them during the backward pass. In some embodiments, step (h) comprises running the optimizer based on layer-adaptive learning rate scaling.

In yet another aspect, this disclosure provides a system for training a neural network facial recognition model. The system comprises a non-transitory, computer-readable memory; one or more processors; and a computer-readable medium containing programming instructions that, when executed by the one or more processors, configure the system to: (a) receive a batch of facial image data and dividing the batch into two or more parts; (b) perform label synchronization and classification layer sampling using full batch labels and keeping track of the normalized weight as a result of the sampling process; (c) forward a first part of the batch through a neural network backbone distributed in a plurality of GPUs; (d) synchronize resulting feature vectors and splitting previously synchronized labels to obtain corresponding labels for the first part of the batch and running forward-backward with sampled weight to compute loss and gradients for sampled weight and feature vectors; (e) run backward from the feature vectors with the gradients to back-propagate and derive gradients for backbone parameters in each layer; (f) perform steps (c) to (e) for the part of the two or remaining parts of the batch to allow gradients to accumulate over the first pass for both the sampled weight and the backbone parameters; (g) synchronize all the backbone parameters across all of the plurality of GPUs; (h) run an optimizer for the sample weight and the backbone parameters; and (i) assign back the sampled weight and optimizer states to the classification layer.

In some embodiments, the batch of facial image data is generated according to the system described above. The neural network facial recognition model is used in the system described above to generate the feature vectors of the facial image dataset.

In some embodiments, the system is configured to discard activations of one or more initial layers in the backbone during the forward pass and recomputing them during the backward pass. In some embodiments, step (h) comprises running the optimizer based on layer-adaptive learning rate scaling.

Facial Detection and Recognition

In some embodiments, the system may include a facial detection module. The facial detection module may include facial detection algorithms capable of detecting a face from a variety of angles. In some embodiments, facial detection may employ algorithms, such as a higher order gradient algorithm (HOG). Alternatively, the system may employ a newer CNN algorithm for more accuracy.

In some embodiments, the facial recognition data include a vector representation of the captured facial image of the subject. In some embodiments, the vector representation comprises a vector with a certain dimension such as 512 or 1024. In some embodiments, the system may use a facial embedding process (e.g., using the neural network to convert facial images to vectors).

Deep convolutional neural networks (CNNs) are the predominant types of neural networks used for multidimensional signal processing. The term deep refers generically to networks having from a "few" to several dozen or more convolution layers. Deep learning refers to methodologies for training these systems to automatically learn their functional parameters using data representative of a specific problem domain of interest. CNNs are currently being used in a broad spectrum of application areas, all of which share the common objective of being able to automatically learn features from (typically massive) databases and generalize their responses to circumstances not encountered during the learning phase. Ultimately, the learned features can be used for tasks such as classifying the types of signals the CNN is expected to process.

Neural Network-Based Facial Recognition

In some embodiments, the system may employ a machine learning module for facial recognition. The machine learning module may employ any one of the following algorithms, including, without limitation, deep convolutional neural network (CNN), support vector machines (SVMs), neural network, logistic regression, naive Bayes, memory-based learning, random forests, bagged trees, decision trees, boosted trees, boosted stumps, etc. Some embodiments of the machine learning module use unsupervised machine learning that provides training data without labeled responses. Examples of unsupervised machine learning techniques use clustering, for example, k-means clustering, hierarchical clustering, and so on.

Neural network technology, also known as "artificial neural network (ANN)," is one of the most developed tools used in machine learning modules for pattern recognition. Neural networks are constructed of processing elements known as neurons. Neurons are interconnected and arranged in a plurality of layers. Each neuron can have multiple inputs but generally only one output, which, in turn, is usually connected to many or all other neurons in the next layer. Neural networks learn by extracting relational information from the data and the desired output. A neural network in the machine learning module is initially trained or fed large amounts of data. In some embodiments, the machine learning module may employ a plurality of neural networks, which may be organized either in series, in parallel, or in a nested fashion. For example, a primary neural network may identify an abnormality of a chassis component and attempts to identify the possible source. The neural networks can be arranged in a tree pattern or in a hierarchical structure, with each neural network trained to perform a particular pattern recognition task. A group of such neural networks may be coupled to other groups of neural networks to handle more complex tasks.

Figure 10:
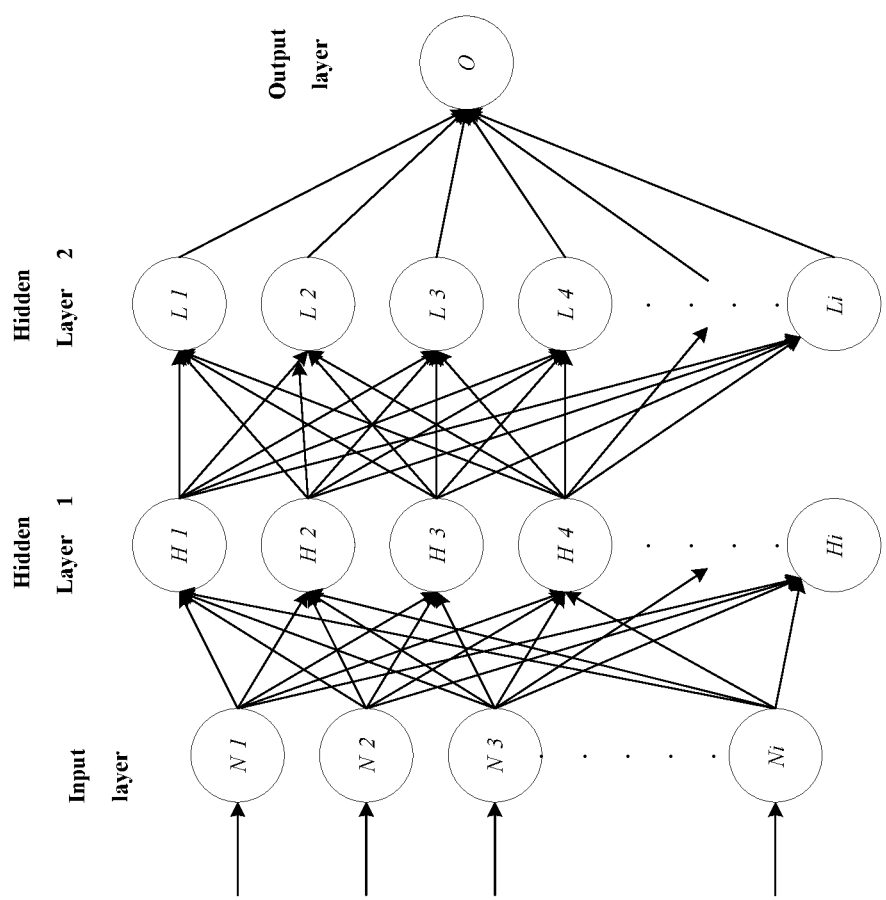
FIG. 10 shows an example neural network implemented for performing facial recognition.

FIG. 10 shows an example of a neural network used for facial recognition. Initially, the system may receive and preprocess facial image data and analyze the preprocessed data with a machine learning module implementing a neural network algorithm. The facial image data directed to the features of a face are fed into nodes N1 through Ni in the input layer.

Each of the input nodes is usually connected to each of the nodes in the second layer (e.g., a hidden layer), H1, H2, H3, H4, . . . , and Hi, through, for example, mathematical functions containing multiplying coefficients (also known as weights). At each hidden layer node, a node value may be obtained by summing the values from each of the input layer nodes, which have been operated on by functions containing the weights. Likewise, the hidden layer nodes are, in turn, connected to the nodes in the second hidden layer, L1, L2, L3, L4, . . . , and Li. The node values of the nodes of the second hidden layer are similarly generated as described above. The nodes of the second hidden layer are connected to the output layer node(s). In this example, only a single node 0, representing the decision to notify the driver, and/or a remote service center, of the unbalanced tire. The output value from the output layer node may have various forms. For example, an output node value of 1 may be assigned to indicate that the driver/service center should be notified, and a value of 0 may be assigned to indicate that the driver/service center should not be notified.

Figure 11:
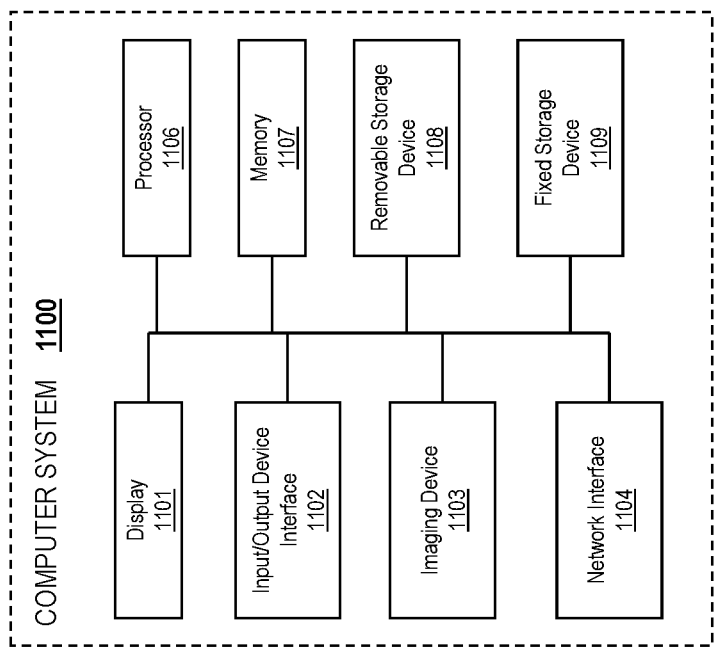
FIG. 11 shows an example system for implementing the disclosed methods.

FIG. 11 is a functional diagram illustrating a programmed computer system in accordance with some embodiments. As will be apparent, other computer system architectures and configurations can be used to perform the described methods. Computer system 1100, which includes various subsystems as described below, includes at least one microprocessor subsystem (also referred to as a processor or a central processing unit (CPU) 1106). For example, processor 1106 can be implemented by a single-chip processor or by multiple processors. In some embodiments, processor 1106 is a general purpose digital processor that controls the operation of the computer system 1100. In some embodiments, processor 1106 also includes one or more coprocessors or special purpose processors (e.g., a graphics processor, a network processor, etc.). Using instructions retrieved from memory 1107, processor 1106 controls the reception and manipulation of input data received on an input device (e.g., image processing device 1103, I/O device interface 1102), and the output and display of data on output devices (e.g., display 1101).

Processor 1106 is coupled bi-directionally with memory 1107, which can include, for example, one or more random access memories (RAM) and/or one or more read-only memories (ROM). As is well known in the art, memory 1107 can be used as a general storage area, a temporary (e.g., scratchpad) memory, and/or a cache memory. Memory 1107 can also be used to store input data and processed data, as well as to store programming instructions and data, in the form of data objects and text objects, in addition to other data and instructions for processes operating on processor 1106. Also, as is well known in the art, memory 1107 typically includes basic operating instructions, program code, data, and objects used by the processor 1106 to perform its functions (e.g., programmed instructions). For example, memory 1107 can include any suitable computer-readable storage media described below, depending on whether, for example, data access needs to be bi-directional or uni-directional. For example, processor 1106 can also directly and very rapidly retrieve and store frequently needed data in a cache memory included in memory 1107.

A removable mass storage device 1108 provides additional data storage capacity for the computer system 1100, and is optionally coupled either bi-directionally (read/write) or uni-directionally (read-only) to processor 1106. A fixed mass storage 1109 can also, for example, provide additional data storage capacity. For example, storage devices 1108 and/or 1109 can include computer-readable media such as magnetic tape, flash memory, PC-CARDS, portable mass storage devices such as hard drives (e.g., magnetic, optical, or solid state drives), holographic storage devices, and other storage devices. Mass storages 1108 and/or 1109 generally store additional programming instructions, data, and the like that typically are not in active use by the processor 1106. It will be appreciated that the information retained within mass storages 1108 and 1109 can be incorporated, if needed, in a standard fashion as part of memory 1107 (e.g., RAM) as virtual memory.

In addition to providing processor 1106 access to storage subsystems, bus 1110 can be used to provide access to other subsystems and devices as well. As shown, these can include a display 1101, a network interface 1104, an input/output (I/O) device interface 1102, an image processing device 1103, as well as other subsystems and devices. For example, image processing device 1103 can include a camera, a scanner, etc.; I/O device interface 1102 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a global positioning system (GPS) receiver, a differential global positioning system (DGPS) receiver, an accelerometer, and/or any other appropriate device interface for interacting with system 1100. Multiple I/O device interfaces can be used in conjunction with computer system 1100. The I/O device interface can include general and customized interfaces that allow the processor 1106 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1104 allows processor 1106 to be coupled to another computer, computer network, or telecommunications network using a network connection as shown. For example, through the network interface 1104, the processor 1106 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1106 can be used to connect the computer system 1100 to an external network and transfer data according to standard protocols. For example, various process embodiments disclosed herein can be executed on processor 1106 or can be performed across a network such as the Internet, intranet networks, or local area networks, in conjunction with a remote processor that shares a portion of the processing. Additional mass storage devices (not shown) can also be connected to processor 1106 through network interface 1104.

In addition, various embodiments disclosed herein further relate to computer storage products with a computer-readable medium that includes program code for performing various computer-implemented operations. The computer-readable medium includes any data storage device that can store data that can thereafter be read by a computer system. Examples of computer-readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system as shown in FIG. 11 is an example of a computer system suitable for use with the various embodiments disclosed herein. Other computer systems suitable for such use can include additional or fewer subsystems. In some computer systems, subsystems can share components (e.g., for touchscreen-based devices such as smartphones, tablets, etc., I/O device interface 1102 and display 1101 share the touch-sensitive screen component, which both detects user inputs and displays outputs to the user). In addition, bus 1110 is illustrative of any interconnection scheme serving to link the subsystems. Other computer architectures having different configurations of subsystems can also be utilized.

Definitions

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

The terms or acronyms like "convolutional neural network," "CNN," "neural network," "NN," "deep neural network," "DNN," "recurrent neural network," "RNN," and/or the like may be interchangeably referenced throughout this document.

In some embodiments, a graphics processing unit (GPU) is communicatively coupled to host/processor cores to accelerate graphics operations, machine-learning operations, pattern analysis operations, and various general purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Aspects of the present disclosure are described herein with reference to flowchart illustrations and/or block diagrams of methods, apparatus (systems), and computer program products according to embodiments of the invention. In some embodiments, the flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It will be understood that, although the terms "first," "second," etc., may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Unless specifically stated otherwise, as apparent from the above discussion, it is appreciated that throughout the description, discussions utilizing terms such as "processing," "performing," "receiving," "computing," "calculating," "determining," "identifying," "displaying," "providing," "merging," "combining," "running," "transmitting," or the like, refer to the action and processes of a computer system, or similar electronic computing device, that manipulates and transforms data represented as physical (or electronic) quantities within the computer system memories or registers or other such information storage, transmission or display devices.

It is noted here that, as used in this specification and the appended claims, the singular forms "a," "an," and "the" include plural reference unless the context clearly dictates otherwise. The terms "including," "comprising," "containing," or "having" and variations thereof are meant to encompass the items listed thereafter and equivalents thereof as well as additional subject matter unless otherwise noted.

As used herein, "plurality" means two or more. As used herein, a "set" of items may include one or more of such items.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

The term "if may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for generating a facial image dataset for training a facial recognition model, comprising:
    receiving a set of facial images comprising a plurality of subsets of facial images, each of the subsets of facial images is associated with a pre-assigned identity label;
    performing intra-identity facial image deduping for each subset of facial images by:
        determining pairwise intra-identity facial image similarity scores between the facial images in the each subset of facial images;
        identifying two or more facial images within the each subset of facial images as duplicate facial images associated with the same identity label if the two or more facial images have an intra-identity similarity score greater than or equal to an intra-identity similarity threshold value; and
        retaining only one of the duplicate facial images after removing the rest of the duplicate facial images;
    performing intra-identity clustering by applying a first clustering similarity threshold to group the deduped facial images in the each subset of facial images into a plurality of clusters; and
    performing intra-identity second-order clustering by determining pairwise cluster similarity scores between centroid vectors of clusters and combining clusters having pairwise cluster similarity score greater than or equal to a second clustering similarity threshold to obtain an intra-identity cleaned facial image dataset, wherein the combined clusters and remaining uncombined clusters are respectively associated with a plurality of actual identities.

2. The method of claim 1, wherein the identity label is selected from a username, a search engine keyword, and an image uploader.

3. The method of claim 1, wherein the step of identifying two or more facial images within the each subset of facial images as duplicate facial images associated with the same identity label is performed by an existing neural network facial recognition model.

4. The method of claim 1, wherein the step of determining pairwise facial image similarity scores comprises determining cosine similarity scores between feature vectors generated by an existing neural network facial recognition model.

5. The method of claim 1, wherein the step of determining pairwise facial image similarity scores further comprises generating an intra-identity similarity matrix.

6. The method of claim 1, wherein the similarity threshold value is between about 0.9 and about 0.95.

7. The method of claim 1, wherein the first clustering similarity threshold is between about 0.45 and about 0.5.

8. The method of claim 1, wherein the second clustering similarity threshold is between about 0.45 and about 0.5.

9. The method of claim 1, wherein the combined clusters and the remaining uncombined clusters are each corresponding to an actual identity, and wherein the actual identity corresponds to the pre-assigned identity label themselves, their friends thereof, or their photography subjects.

10. The method of claim 1, wherein the combined clusters and the remaining uncombined clusters are each assigned new identity labels and become new subsets of facial images.

11. The method of claim 1, further comprising removing the actual identity cluster with face counts lower than three faces.

12. The method of claim 1, further comprising: performing inter-identities merging by:
    determining pairwise inter-identity similarity scores between centroid feature vectors of different subsets of facial images that are associated with different identity labels; and
    merging two or more subsets of facial images having an inter-identity similarity score greater than or equal to a first inter-identity similarity threshold value to obtain an inter-identity cleaned facial image dataset.

13. The method of claim 12, further comprising performing inter-identities deduping by:
    determining pairwise inter-identity facial image similarity scores between centroid feature vectors of different subsets of facial images that are associated with different identity labels;
    identifying two or more subsets of facial images as duplicate subsets of facial images associated with the same identity label if the two or more subsets of facial images have an inter-identity similarity score greater than or equal to a second inter-identity similarity threshold value; and
    retaining only one of the duplicate subsets of facial images after removing the rest of the duplicate subsets of facial images.

14. The method of claim 12, wherein the first inter-identity similarity threshold value is about 0.5 or above.

15. The method of claim 13, wherein the second inter-identity similarity threshold value is between about 0.4 and about 0.45.

16. The method of claim 12, wherein the step of determining the pairwise facial image similarity scores between facial images comprises determining cosine similarity scores between feature vectors generated by an existing neural network facial recognition model.

17. The method of claim 12, wherein the step of determining pairwise facial image similarity scores further comprises generating an inter-identity similarity matrix.

18. The method of claim 12, wherein the step of identifying two or more facial images within the different subsets of facial images as duplicate facial images is performed by an existing neural network facial recognition model.

19. The method of claim 16, comprising iteratively training and updating the existing neural network facial recognition model using the inter-identity cleaned facial image dataset.

20. The method of claim 1, further comprising distributing feature centroid vectors in chunks to a plurality of graphics processing units (GPUs), wherein each chunk is distributed to one GPU.

21. The method of claim 20, wherein an inner product between the centroid vectors from the same set and the chunks in the GPUs become similarity scores, and wherein the similarity scores below a threshold are removed and the remaining similarity scores are streamed into a file to form a sparse matrix representation for efficiency of storage and downstream processing.

22. The method of claim 21, wherein the threshold is between about 0.2 and about 0.4.

23. The method of claim 1, further comprising augmenting facial images in the cleaned facial image dataset by adding one or more variations selected from accessory addition, lighting variations, age simulation, pose alteration, and face blending.

24. A system for generating a facial image dataset for training a facial recognition model, comprising:
a non-transitory, computer-readable memory;
one or more processors; and
a computer-readable medium containing programming instructions that, when executed by the one or more processors, configure the system to:
receive a set of facial images comprising a plurality of subsets of facial images, each of the subsets of facial images is associated with a pre-assigned identity label;
perform intra-identity facial image deduping for each subset of facial images by:
determining pairwise intra-identity facial image similarity scores between the facial images in the each subset of facial images;
identifying two or more facial images within the each subset of facial images as duplicate facial images associated with the same identity label if the two or more facial images have an intra-identity similarity score greater than or equal to an intra-identity similarity threshold value; and
retaining only one of the duplicate facial images after removing the rest of the duplicate facial images;
perform intra-identity clustering by applying a first clustering similarity threshold to group the deduped facial images in the each subset of facial images into a plurality of clusters; and
perform intra-identity second-order clustering by determining pairwise cluster similarity scores between centroid vectors of clusters and combining clusters having pairwise cluster similarity score greater than or equal to a second clustering similarity threshold to obtain an intra-identity cleaned facial image dataset, wherein the combined clusters and remaining uncombined clusters are respectively associated with a plurality of actual identities.

* * * * *